(12) United States Patent
Andreoletti et al.

(10) Patent No.: US 7,971,109 B2
(45) Date of Patent: Jun. 28, 2011

(54) METHOD FOR IMPROVING THE INTEGRITY OF COMMUNICATION MEANS

(75) Inventors: Remi Andreoletti, Tournefeuille (FR); Christian Pitot, Boulogne-Billancourt (FR); Patrice Toillon, Fourqueux (FR)

(73) Assignee: Thales (FR)

( * ) Notice: Subject to any disclaimer, the term of this patent is extended or adjusted under 35 U.S.C. 154(b) by 175 days.

(21) Appl. No.: 12/328,193

(22) Filed: Dec. 4, 2008

(65) Prior Publication Data

US 2009/0183038 A1   Jul. 16, 2009

(30) Foreign Application Priority Data

Dec. 4, 2007   (FR) ...................................... 07 08461

(51) Int. Cl.
*G06F 11/00* (2006.01)
(52) U.S. Cl. ...................................................... 714/708
(58) Field of Classification Search .................. 714/704, 714/708
See application file for complete search history.

(56) References Cited

U.S. PATENT DOCUMENTS

| | | | | |
|---|---|---|---|---|
| 5,271,011 A * | 12/1993 | McMullan et al. | ........... | 714/807 |
| 5,329,520 A * | 7/1994 | Richardson | .................. | 370/225 |
| 5,655,068 A | 8/1997 | Opoczynski | | |
| 6,219,389 B1 * | 4/2001 | Pappas et al. | .................. | 375/341 |
| 6,308,298 B1 * | 10/2001 | Blatchley et al. | ............. | 714/775 |
| 7,246,303 B2 * | 7/2007 | Bansal et al. | .................. | 714/800 |
| 7,555,700 B2 * | 6/2009 | Takagi | ........................ | 714/774 |
| 7,747,734 B2 * | 6/2010 | Aldereguia et al. | ........... | 709/224 |
| 2002/0194524 A1 | 12/2002 | Wiley et al. | | |
| 2003/0137975 A1 * | 7/2003 | Song et al. | ..................... | 370/353 |
| 2005/0008064 A1 * | 1/2005 | Hammes et al. | ............... | 375/131 |
| 2006/0013141 A1 * | 1/2006 | Mutoh et al. | ................... | 370/241 |
| 2008/0005706 A1 * | 1/2008 | Sharma et al. | ..................... | 716/4 |
| 2009/0024883 A1 * | 1/2009 | Bethard | ........................ | 714/708 |
| 2009/0073918 A1 * | 3/2009 | Conforto et al. | ............... | 370/316 |

FOREIGN PATENT DOCUMENTS

WO   WO-94/26052 A   11/1994

* cited by examiner

*Primary Examiner* — James C Kerveros
(74) *Attorney, Agent, or Firm* — Stroock & Stroock & Lavan LLP

(57) ABSTRACT

Embodiments of the invention enable the integrity of data processed by a switch to be guaranteed better than $10^{-9}$ undetected erroneous frames per flight hour. To do this, rules for disabling ports are included in the switch management program. These rules include a maximum absolute admissible number of erroneous frames, to a maximum relative rate of admissible erroneous frames and a minimum number of erroneous frames constituting a significance threshold. Random errors are detected at the level of each frame due to the insertion of a CRC. Deterministic or data-dependent errors able to deceive systematically the CRC check are made random by means of a frame index.

10 Claims, 3 Drawing Sheets

METHOD FOR IMPROVING THE INTEGRITY OF COMMUNICATION MEANS

FIELD OF THE INVENTION

This application claims priority under 35 U.S.C. §119 from French patent application No. 0708461 filed with the French Patent Office on Dec. 4, 2007, which is incorporated herein by reference in its entirety.

The invention applies to the field of communication on networks where high data integrity must be guaranteed. More specifically, the invention applies particularly to network switches for transmission of critical data for aircraft flight management applications. In such a context, it is conventional to associate a check code, generally of 32 bits, called CRC (Cyclic Redundancy Check) with each transmitted frame, and to verify at the other end of the transmission channel that this code has been preserved.

BACKGROUND OF THE INVENTION

The problem posed by this known technique is that the probability of detecting a transmission error on the channel, depending on the length of the CRC, is nevertheless $½^{32}$. Even by confirming the transmission through channel redundancy, the probability of non-detection remains $10^{-6}$ per hour in the case of a 100 Mbs Ethernet or of an AFDX (Avionics Full DupleX switched Ethernet) bus. This value is generally greater than what is required for transmission of flight critical data; that is to say, any piece of data in which the erroneous value can to trigger a scenario classed as catastrophic because it may lead to the loss of the aircraft and its passengers. Data such as altitude, velocity, variables involved in the flight control, fuel quantity, flow or temperature etc. are, for example, pieces of information which, in certain conditions depending on the aeroplane system using them, may cause inappropriate system responses capable of leading to such scenarios. The certification standards for aircraft used in commercial transport require demonstration that the probability of catastrophic scenarios occurring is less than $10^{-9}$ per flight hour. On-board communications networks causing several of these systems to communicate are led to carry information flows contributing to a significant quantity of such scenarios. For the modern aircraft in which such communications networks are used, it is acceptable to consider the network system a system in its own right and to allocate it intrinsic performances in terms of the integrity of data carried. It is generally agreed to set the maximum rate of undetected erroneous data at a value equal to $10^{-9}$ per flight hour to make such a communications system suitable for carrying critical information. Generally, for reasons of availability it is known to duplicate the communications network and to look for behaviour of each network consisting in disabling the frames or the erroneous data flows detected or even the network itself by relying on the second redundant network. It is therefore possible to think of disabling the communications channel responsible for exceeding an error threshold (which assumes detecting and accounting for the errors), but it is only possible to show that errors being reproduced in a systematic manner for particular data would be detected. In the following text, errors statically affecting a piece of data that is itself static such that the non-detection by the CRC, when it occurs, is reproduced indefinitely as long as the piece of data remains unchanged, will be called systematic or deterministic errors.

Regulations also require that a catastrophic scenario must not result from a single event (a simple failure), whatever the associated probability. Thus it can be seen that, although its probability remains tiny, such a systematic error cannot be tolerated in so far as it may easily result from a simple failure.

BRIEF SUMMARY OF THE INVENTION

The present invention solves this problem by providing a means for ensuring the detection of such systematic errors in data.

To this end, the invention discloses a network switch for the communication of frames over communications channels, said switch comprising a database and rules for managing the switch traffic, said frames each comprising a frame index and a frame check code, wherein at least one of the traffic management rules allows disabling of a communications channel through comparison with error count thresholds for detected transmission errors stored in the database.

Advantageously, said detected transmission errors include deterministic errors in the data.

Advantageously, said thresholds include at least an absolute number of errors.

Advantageously, said absolute number of errors is set at a value of the order of 1138 Ethernet frames per second when the theoretical data rate of the channel is around 100 megabits per second.

Advantageously, said thresholds comprise at least a relative error rate.

Advantageously, said relative error rate is set at a value of around 1% of frames when the theoretical data rate of the channel is around 100 megabits per second.

Advantageously, said thresholds include at least a minimum number of rejected frames.

Advantageously, said minimum number of rejected frames is set at a value of around 2274 Ethernet frames per second when the theoretical data rate of the channel is around 100 megabits per second.

The invention also discloses a method for detecting and processing failures in a communications network switch for frames over communications channels, said method comprising a step of generating a frame index, a step of inserting a frame check code and a step of disabling a transmission channel, wherein the disabling results from the comparison with detected transmission error thresholds.

The invention furthermore has the advantage of being particularly well suited to the AFDX communications used in aircraft and described in the ARINC (Aeronautical Radio Inc.) standard 664. In particular, it allows demonstration of the critical level of data integrity required by the certifying organizations.

BRIEF DESCRIPTION OF THE DRAWINGS

The invention will be better understood and its various features and advantages will emerge from the following description of several embodiments and of the appended figures, wherein.

DETAILED DESCRIPTION

Several architectures are possible for communications on the data networks used by avionics applications. In particular, the number of switches may vary from several units to close to twenty. It is even more important to be able to demonstrate the preservation of data integrity on an architecture with a small number of switches, i.e. where the probability that one failure will lead to an error in a critical piece of data and also be the origin of a second fatal error is necessarily higher. The invention will therefore be even more useful in this type of architecture.

Figure 1:
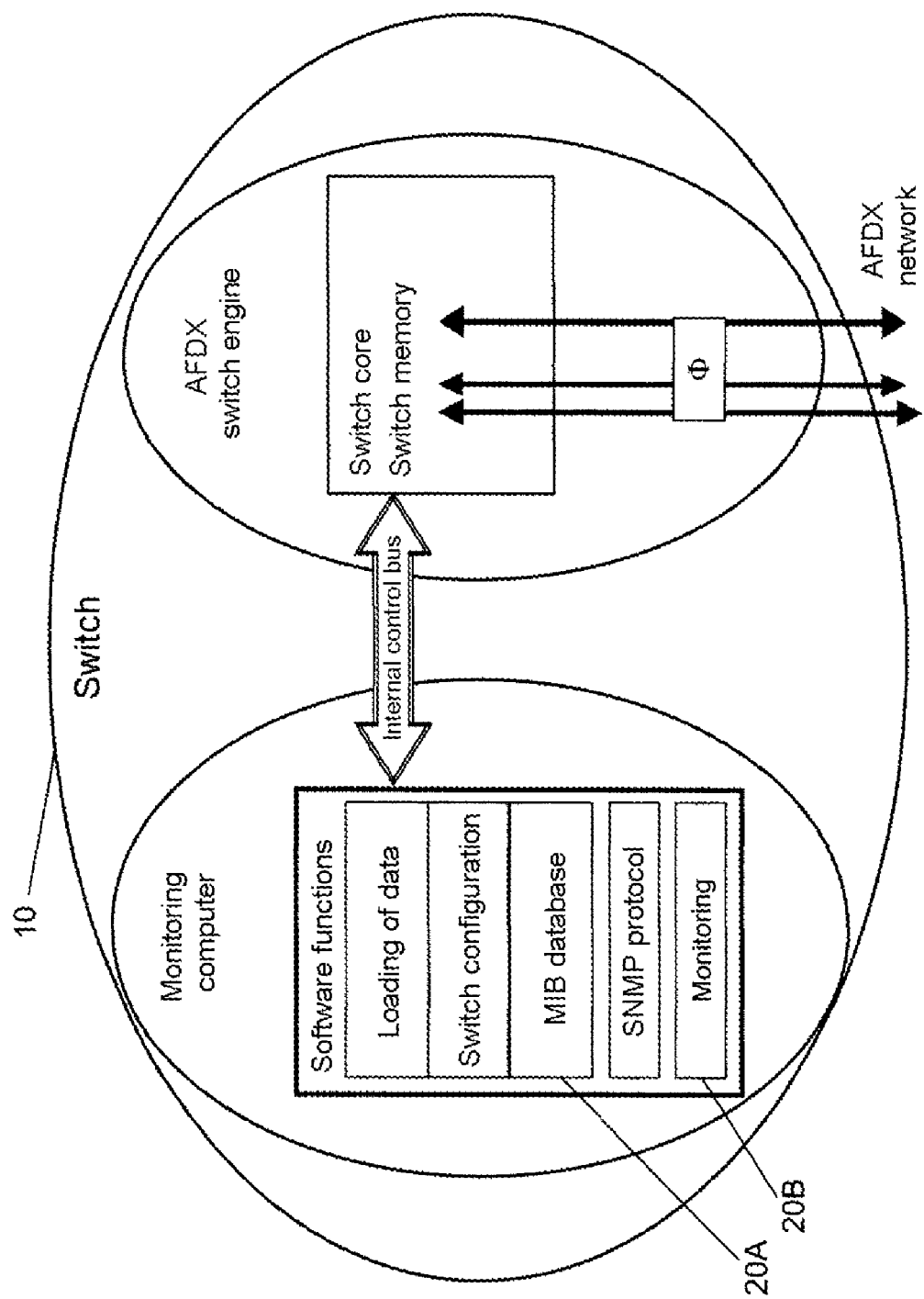
FIG. 1 shows the architecture of a communications network switch of a type allowing implementation of the invention.

Each switch 10 comprises in particular the functions illustrated in FIG. 1, by way of example only, other architectures being completely possible for implementing the invention. A switch module comprises a switch engine and a monitoring computer. The switch engine is a machine carrying out the routing of incoming packets (or frames) towards the output ports. This routing is done as a function of a bit field from the IEEE 802.3 Ethernet frame which is the MAC (Medium Access Control) destination address field. The monitoring computer carries out in particular the following functions under the supervision of software: configuration of the switch engine during the initialization phase; constitution of the database 20A (generally denoted by the term Management Information Base or MIB) belonging to the switch and able to be consulted by a network manager (not shown) via the SNMP (Simple Network Management Protocol) protocol; responses to consultations with the network manager (not shown) according to the SNMP protocol. This processor is also responsible for switch monitoring tasks (monitoring function, 20B). For all these tasks the processor accesses the switch engine configuration via a dedicated control bus (for example a PCI bus) through which it can: consult the internal resources of the switch (registers or counters dedicated to monitoring), configure the switch during the initialization phase or repair configuration elements possibly damaged in the operational phase, enable or disable ports/channels by acting on control registers inside the switch engine or through the switch engine on the physical interface ($\Phi$) components using a serial dialogue (Management Data Input/Output or MDIO) line included in the interface with these components. The routing function is mentioned here in order to describe the content and is not, in any case, part of the invention which might equally well be applied to a terminal, a device in which the routing function of a switch is absent. Depending on these fields and configuration tables that are predefined and loaded by the monitoring computer during an initialization phase, the switch engine knows to which output ports each incoming frame is to be routed. In the particular case of an AFDX switch, it also carries out, before the routing, all sorts of consistency checks. This is particularly the case with the frame policing function, which aims at guaranteeing and, if necessary, at limiting the bandwidth associated with each of the virtual links (VL) corresponding to the calibrated data flows between systems by deleting frames violating the bandwidth budget allocated to a definite data flow. This frame policing function is also parameterized by configuration tables loaded by the monitoring computer during an initialization phase.

For the requirements of the MIB constitution, it is usual for the digital interface devices or MAC layers associated with each of the bidirectional ports of the switch to have a battery of counters designed so as to accumulate over a short duration (typically one second) the number of events or the quantitative variables associated with the information flow being processed that will be acquired in a period of the same order by the manager constituting the MIB. A non-exhaustive list of the types of quantities thus gathered is provided below by way of example:

number of Ethernet frames transmitted without errors by a given port number of Ethernet frames received without errors by a given port number of bytes transmitted via error-free frames number of bytes received via error-free frames numbers of errors having caused the transmission of a frame to be abandoned number of CRC errors having caused the reception of a frame to be abandoned number of errors in length having caused the reception of a frame to be abandoned etc.

It is noted that, having available all the information coming from MIBs from all the nodes and terminals of the network, i.e. notably for all the ports of all the switches of a network, the network manager may thus constitute a network level MIB and establish a map of data flows exchanged in each direction in each inter-switch connection and of pathological situations possibly connected with an abnormal number of reported errors coming from an area of the network (connection between two switches, all the connections of a switch with its neighbours, connections of several switches, etc.).

The data gathered by the manager of the MIB specific to a switch may advantageously be used in order to take immediate action at the switch itself with a view to improve the integrity of transmitted data. Such an action may notably be the disabling of a port, for example imposing a complete suspension of data flows passing through this port. One of the causes of disabling is the detection of an unusually high flow of non-integral data. A corrupted frame is conventionally detected using a check code inserted in each frame. In accordance with the IEEE standard 802.3 applicable to both Ethernet switches and to AFDX switches, this check code is of the CRC (Cyclic Redundancy Cycle or Cyclic Redundancy Check) type.

Figure 2:
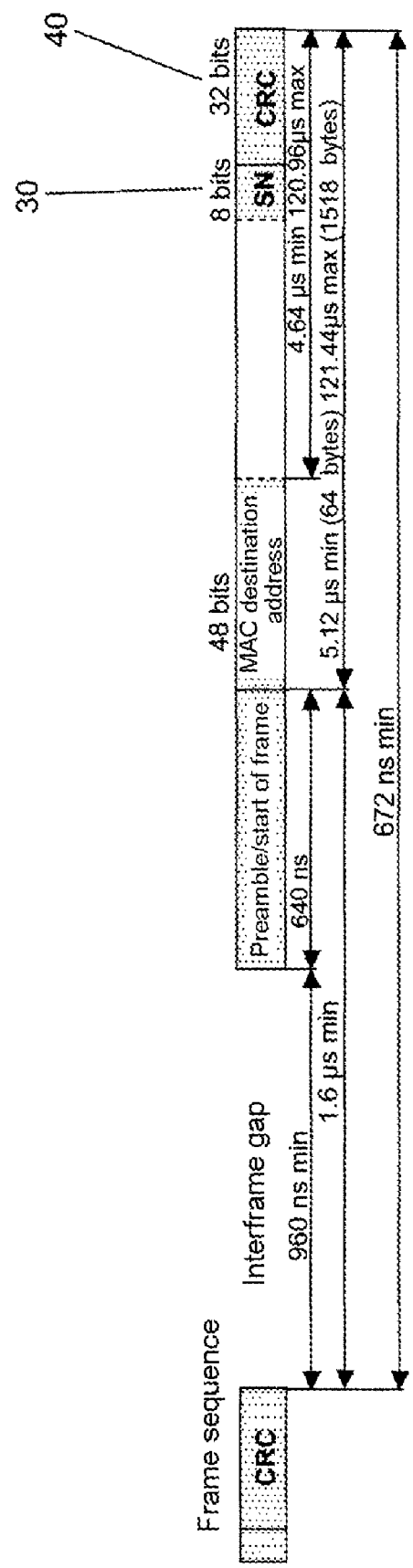
FIG. 2 shows the structure of a frame allowing implementation of the invention.

FIG. 2 shows the structure of a frame according to the standard comprising a CRC 40. Each frame comprises a header called the preamble in the standard and consists of a minimum sequence of alternating 1s and 0s enabling the local clock to synchronize itself with the modulated signal coming from the distant transmitter. This preamble is followed by a start of frame, which introduces the useful part of the frame that immediately follows it and to which the CRC calculation relates. Then comes the MAC destination address, the data, a sequence number SN 30 and the CRC 40. The CRC used for checking the communications on an Ethernet network or on an AFDX network is a 32-bit CRC or CRC-32. The principle of use for the CRC-32 is the following: the binary number constituted by the frame is divided by a polynomial of order 32 of the type $x^{32}+x^{26}+x^{23}+x^{22}+x^{16}+x^{12}+x^{11}+x^{10}+x^{8}+x^{7}+x^{5}+x^{4}+x^{2}+x+1$. The remainder from this division constitutes the CRC-32 and is appended to the frame. At the other end of the channel or at the switch output, it is verified that the received CRC is valid. This technique is particularly effective as each affected frame of an erroneous bit stream of length less than that of the CRC-32 is detected with certainty and as the probability that a frame affected by an error of a size greater than that of the CRC-32 not being detected is only $\frac{1}{2}^{32}$ or $2.3283 \times 10^{-10}$ (if the erroneous bits are divided over the whole of the frame and not confined within a stream of 32 consecutive bits in the direction of the Ethernet 802.3 transmission, or 8 nibbles of 4 consecutive bits). The size of the erroneous bit stream is characterized by the difference between the ranks of the last and the first erroneous nibbles of the frame in the order in which the nibbles are considered in the CRC calculation. This order is also that of their transmission over the physical medium. In the case of a wired AFDX connection operating at saturation, 148810 frames may be received each second and if all are erroneous in a random manner, the rate of erroneous frames likely to get round the CRC barrier is hence 0.125 per hour (error recurrence of 8 hours), whereas the use of the network in an aircraft for carrying critical data leads to a probability being sought that is less than $10^{-9}$ per hour for an event capable of having catastrophic consequences. It is, however, usual to compensate for this weakness by using the convention that a single erroneous piece of data cannot have catastrophic consequences. This is easily achievable by confirming the calculation over at least two calculation cycles from new data. However, even if the confirmation takes place in a time lapse of 100 ms, the density of the event "more than one erroneous frame with a correct CRC received in the corresponding time lapse" is of the order of $10^{-6}$ per hour, which is insufficient to be used as a sole argument with a view to the certification of a critical system.

In order to guarantee the integrity of the data processed by the switch three orders of magnitude better than that provided by the CRC, it is proposed to disable a port from the moment it generates an error rate greater than predetermined thresholds. In order to demonstrate that the establishment of a threshold enables any type of error to be processed, the material failures able to produce an erroneous data transmission nonetheless associated with a correct CRC are classified into two categories. Failures whose expression, independently of the data transmitted, is reflected by a discrepancy in the transmission and hence a perceptible increase in the error rate (bit error rate or BER), are examined first of all. This error rate significantly reduces the proportion of correct frames and correlatively creates a high erroneous frame rate with which an undetected erroneous frame rate $2^{32}$ times lower is inevitably associated. It therefore suffices to detect the appearance of an erroneous frame rate higher than an acceptability threshold to disable the reception channel and very quickly reduce the risk associated with an erroneous piece of data to zero. In critical systems, it is therefore necessary to demonstrate that this detection allows disabling of the port before catastrophic consequences have been able to spread. Let us assume that it is possible to detect such a drift and to disable the port the second it appears; the time of risk is thus reduced to 1 second (instead of the flight time), which easily allows the 3 orders of magnitude lacking in the preceding outline demonstration to be provided. It is then necessary to deal with the case of failures which do not introduce discrepancies into the transmission and are likely to be reproduced systematically and hence in an identical manner whenever the conditions for their appearance are met. These failures can be assimilated to a channel with a disturbance potentially independent of the data, but which, associated with a family of particular frames, systematically produces a correct CRC, despite alteration of the data. In order to curb this threat, it is suggested to add a variable field of length less than the size of the CRC and that can be changed systematically with each transmitted frame of the data stream (this variable field may, for example, be generated by a counter). Changing the piece of data and hence the associated CRC in a systematic manner avoids the situations in which an unchanged piece of data would always be altered in the same way and undetectably. It also allows avoidance of the confirmation mechanisms being found to be at fault, and facilitates the detection of the disturbance by the detection of erroneous frame flow described above, even in the case of recurrent transmission of the same useful piece of data.

The implementation of the method described above is particularly suited to the AFDX communications used in aircraft and described by the ARINC 664 standard. In this communications protocol constructed using the Ethernet standard (IEEE 802.3), the data flows are separated into VLs (Virtual Links), each VL possessing a dedicated address characterized by a unique "MAC destination" field. In addition, a variable 8-bit field, the sequence number (SN) 30 associated with the VL, is subject to evolution for each transmitted frame of the VL considered. This field was initially introduced in addition to the fields specified by IEEE 802.3 to enable the management of network redundancy by the terminal and the detection of modes of failure such as frame re-ordering inside a given flow and babbling, which are common and feared modes of malfunction of data switches. This additional field also perfectly meets the needs of demonstrating integrity according to the method of the invention. To the extent that the SN, which is an element of the frame, is taken into account for calculating the CRC, deterministic errors in the data, such as one or more sticking bits for example, will in reality be detected by the CRC, which will necessarily not be in conformity although the data are identical, as the data have different SNs. Thus the two types of error are taken into account by the device and the method according to the invention: to the extent that the error threshold leading to disabling of a port is fixed at an appropriate level, it is possible to demonstrate that the failure rate will necessarily be less than $10^{-9}$ for random errors. To the extent that the failure statistics of the CRC-32 also take into account the deterministic errors that cannot deceive a CRC-32 calculated over a frame comprising a sequence number, both error categories are taken into account by the invention.

Figure 3:
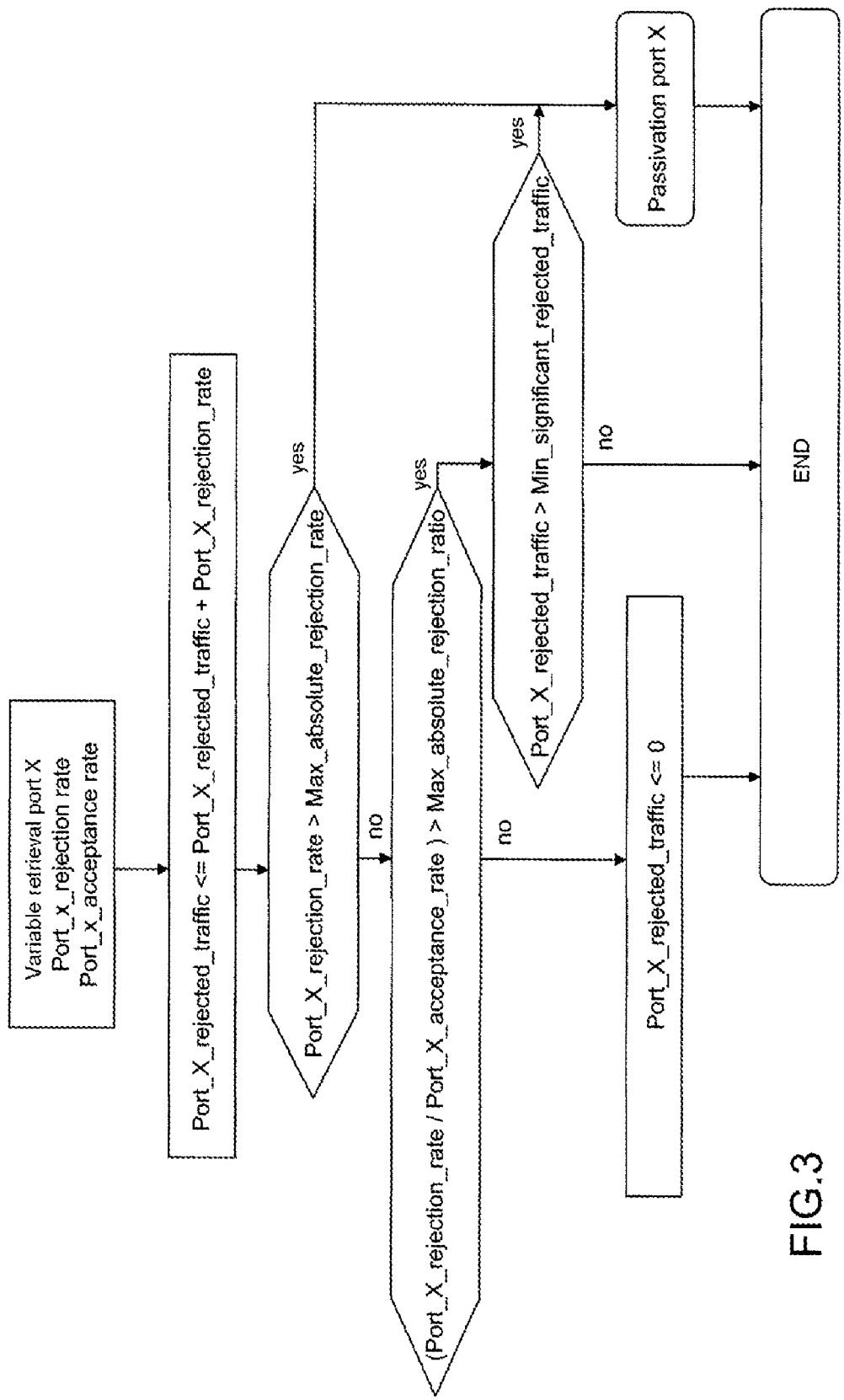
FIG. 3 shows a flow chart of the processes according to the invention.

FIG. 3 shows the flowchart of processes of the method according to the invention. The following variables and parameters are defined:

Port_X_rejection_rate is the number of erroneous frames detected per second at the port X; this value is periodically acquired during the constitution of the local MIB from error counters of the MAC layer on reception by the port considered;

Port_X_acceptance_rate is the number of valid frames detected per second at the port X; this value is also a piece of data drawn from counters of the MAC layer on reception by the port;

Max_absolute_rejection_rate (in number of frames per second) is the rejection rate threshold leading to disabling of a port;

Max_absolute_rejected_traffic is the rejection rate (as a percentage) leading to disabling of a port;

Min_significant_rejected_traffic is the minimum number of erroneous frames (to avoid the disabling of a port caused by momentary short-term concentration of erroneous frames of the random error distribution type. This type of event basically corresponds to lightning strike situations against which the system must be robust).

The algorithm for detecting failures of a port X is hence:
Begin
Port_X_rejected_traffic<=Port_X_rejected_traffic+
Port_X_rejection_rate
if Port_X_rejection_rate>Max_absolute_rejection_rate=>
failure detection
else if (Port_X_rejection_rate/Port_X_acceptance_rate)
>Max_absolute_rejection_ratio
if
Port_X_rejected_traffic>Min_significant_rejected_traffic=>
failure detection
else=>no action
else Port_X_rejected_traffic<=0
End When the disabling threshold is exceeded at port X, a disabling command is sent to the core of the switch in the dedicated internal network.

The Boolean status variable (healthy port/unhealthy port) is shifted to the unhealthy state. The aim of the monitoring is to detect any failure causing a significant ratio of rejected frames to be exceeded. In fact, there may be several causes for rejecting a frame. For each frame received by the receiver stage, the MAC layer verifies the following points:

presence of a minimum preamble plus start of frame sequence following a minimum interframe gap or IFG;

continuous bit stream comprising a whole number of bytes (even number of nibbles);

continuous bit stream before following IFG comprising at least 64 consecutive bytes;

continuous bit stream before following IFG comprising at most 1518 bytes; and

CRC correct.

Each observed error causes the rejection of the current frame and the incrementation of an associated error counter. A MAC layer may therefore comprise up to 5 error counters, if it is desired to be able to differentiate each of the causes of error:

rejection due to an invalid preamble/start of frame sequence following a minimum IFG;

rejection due to an odd number of nibbles following a valid minimum IFG-preamble/start of frame sequence;

rejection due to a continuous stream of nibbles of less than 64 bytes following a valid minimum IFG-preamble/start of frame sequence;

rejection due to a continuous stream of nibbles of greater than 1518 bytes following a valid minimum IFG-preamble/start of frame sequence; and rejection due to an incorrect CRC while all the preceding criteria are correct.

In order to implement the invention, the number of rejections is of interest, i.e. the sum of all the causes of rejection and therefore the accumulated total of these counters. The decision to be taken does not depend on the causes and would apply in the same way with a MAC layer that does not separate the causes of rejection. Each MAC reception layer of each input port of the switch comprises at least one counter accumulating the frame rejection situations. Each MAC reception layer of each port also comprises at least one counter accumulating the number of correct frames received.

The value of the counters can be accessed by the monitoring function executed by the processor. The monitoring function periodically retrieves the value of the counter(s) associated with the MAC layer. This retrieval is taken into account by the monitoring and also causes the monitoring counter(s) of the MAC reception layer to be reset to zero. The monitoring function works out the sum of the content of the rejection counters in the case of plurality, retrieves the received-frame counter and carries out the processing, leading possibly to the action of passivation of the port concerned.

It should be noted that, as these counters are automatically reset to zero during retrieval, the simple fact of periodically retrieving them provides access to a measurement of data rate. The sum of all the rejection counters constitutes the variable Port_X_rejection_rate. The accepted-frame counter constitutes the variable Port_X_acceptance_rate.

The mechanism is based on the assumption that, for random, data-independent errors, any acceptance of a corrupted frame due to such an error will be associated with a high frame rejection rate at the MAC layer. In this case, the probability of several corrupted frames being accepted from the same virtual link before disabling of the port is very low and quickly decreases towards zero.

To implement the invention on a network functioning at a theoretical data rate of 100 megabits per second, the Max_absolute_rejection_rate threshold can advantageously be set at 1138 frames per second. This choice results from the following considerations. If E is defined as being the rate of erroneous frames (in number of frames per second) for which the mathematical expectation of the event "more than one corrupted frame accepted per second" is greater than or equal to $10^{-9}$, E is found as the solution of the first-order equation $10^{-9}=3600*(E*2^{-32})^2$, or E=2264 frames/s. Above this corrupted-frame rate, the acceptable integrity threshold is not guaranteed. But, in order to avoid a reduction in switch availability caused by unfavourable atmospheric conditions, for example a storm accompanied by lightning, the threshold must be set at a level higher than the number of frames corrupted due to this cause. The latter is calculated according to the DO160 standard governing the test condition for environmental qualification and notably lightning with electrical pulse trails corresponding to models of lightning of a duration of 160 µs and comprising 24 pulses. There are found to be 572 frames/s (160×24/6.72). In order to optimize protection between these two limits, it is advantageous to choose the harmonic mean of these two values, namely $(2264 \times 572)^{1/2}$, which leads to the recommended value of Max_absolute_rejection_rate set at 1138 frames/s. A second test is carried out as a percentage of traffic in order to protect against the case in which the traffic is too low to lead to a critical number of erroneous frames in a reasonable time. This rate is advantageously set to a value of 1% based on the following reasoning: the maximum calculated value of 2264 corrupted frames per second corresponds to a rate of corrupted frames of 1.52% of the saturation flow rate of 148 810 frames/s. The chosen value of 1138 corrupted frames per second corresponds to a corrupted frame rate of 0.76% on the basis of the same saturation flow rate value. The value of 1% is situated in the middle of the range and is appreciably higher than the corruption rate due to environmental causes (0.36%). Comparison with the parameter Min_significant_rejected_traffic allows disabling of a port to be avoided in the case of a temporal concentration of a high number of corrupted frames. In order to set this parameter, it is borne in mind that the corresponding number of erroneous frames must not be reached in less than a second, otherwise the comparison with Max_absolute_rejection_rate would have triggered disabling of the port. It must therefore be greater than twice this value. For safety, the lower bound of the domain is taken, or 2×1137=2274 frames.

For data-dependent failures, for example in the case of "sticking bits of fixed digit place" for which a particular constant piece of data might constantly deceive the CRC, the evolution of the sequence number associated with the integrity check carried out at the terminal controller completely eliminates the risk of accepting identical "sticking" data. This is because two frames containing the same data will have different CRCs due to the integration of the sequence number in the calculation. Because of this, the deterministic errors are viewed as random errors and automatically taken into account in the detection algorithm and the decision to disable a port.

Of course, these parameter values are provided only by way of example and other values may be given to the parameters without departing from the scope of the present invention.

What is claimed is:

1. A network switch for communication of data frames comprising data, over a communications channel, said switch comprising:

a database; and a programmed processor operating to carry out a plurality of traffic management rules for managing the switch traffic, wherein each data frame comprises:
   a frame index; and
   a frame check code, wherein at least one of the traffic management rules allows disabling of the communications channel through comparison with error detection count thresholds for detected transmission errors stored in the database, said error detection being based on said frame check code.

2. The switch according to claim 1, wherein the detected transmission errors include deterministic errors in the data.

3. The switch according to claim 1, wherein said error count thresholds include at least an absolute number of errors.

4. The switch according to claim 3, wherein said absolute number of errors is set at a value of approximately 1138 Ethernet frames per second when the theoretical data rate of the communications channel is approximately 100 megabits per second.

5. The switch according to claim 1, wherein said error count thresholds comprise at least a relative error rate.

6. The switch according to claim 5, wherein said relative error rate is set at a value of approximately 1% of Ethernet frames when the theoretical data rate of the communications channel is approximately 100 megabits per second.

7. The switch according to claim 1, wherein said error count thresholds include at least a minimum number of rejected frames.

8. The switch according to claim 7, wherein said minimum number of rejected frames is set at a value of approximately 2274 Ethernet frames when the theoretical data rate of the communications channel is approximately 100 megabits per second.

9. A method for detecting and processing failures in a communications network switch for data frames over a communications channel, said method comprising steps of:
   generating a frame index;
   inserting a frame check code;
   comparing detected transmission errors with detected transmission error thresholds, said detected transmission errors being based on said frame check code; and
   disabling a transmission channel, based on the comparing step.

10. A method according to claim 9, wherein the detected transmission errors include deterministic errors in the data.

* * * * *